United States Patent
Faus et al.

(10) Patent No.: US 7,827,241 B2
(45) Date of Patent: Nov. 2, 2010

(54) OPEN CUSTOMER DATABASE FOR USE BY THIRD PARTIES

(75) Inventors: Norman Lee Faus, Holly Springs, NC (US); John R. Mattox, Raleigh, NC (US)

(73) Assignee: Red Hat, Inc., Raleigh, NC (US)

( * ) Notice: Subject to any disclaimer, the term of this patent is extended or adjusted under 35 U.S.C. 154(b) by 235 days.

(21) Appl. No.: 11/849,094

(22) Filed: Aug. 31, 2007

(65) Prior Publication Data

US 2009/0063634 A1 Mar. 5, 2009

(51) Int. Cl.
*G06F 15/16* (2006.01)
(52) U.S. Cl. .................. 709/204; 709/203; 709/217; 709/229; 726/27
(58) Field of Classification Search .......... 709/203, 709/217, 229, 204; 707/104.1; 726/27
See application file for complete search history.

(56) References Cited

U.S. PATENT DOCUMENTS

| 2005/0067493 A1* | 3/2005 | Urken | 235/386 |
| 2007/0180388 A1* | 8/2007 | Izhikevich | 715/751 |
| 2008/0250331 A1* | 10/2008 | Tulshibagwale | 715/751 |

OTHER PUBLICATIONS www.mediawiki.org/wiki/Extension:Email_notification as archived by the Internet Archive (archive.org) on Jan. 2, 2007, 11 pages.*
meta.wikimedia.org as archived by the Internet Archive (archive.org) on Dec. 6, 2004, 67 pages.*
en.wikipedia.org/wiki/Wikipedia:Copyrights as archived on Dec. 3, 2003, 13 pages.*
Adler et al. "A Content-Driven Reputation System for the Wikipedia" WWW 2007, May 8-12, 2007, Canada, pp. 261-270.*
Boothby, Rod. "A Digg type tool can solve Wikipedia's problems" Dec. 9, 2005. printed from innovationcreators.com/wp/?p=63.*
Adler et al. "A Content-Driven Reputation system for the Wikipedia" IW3C2, WWW 2007, ACM, May 2007. pp. 261-270.*

* cited by examiner

*Primary Examiner*—David Lazaro
(74) *Attorney, Agent, or Firm*—MH2 Technology Law Group LLP

(57) ABSTRACT

Embodiments of the present teachings provide for systems and methods of maintaining published information about an entity. The systems and methods allow updates to information associated with a website. Votes are received from different sources and the information is given a confidence indicator based on the sources and other factors. A weight for the votes is determined based on the sources, and a confidence indicator is determined base on the weight of the votes. The updated information and the confidence indicator can be published on the website.

13 Claims, 2 Drawing Sheets

OPEN CUSTOMER DATABASE FOR USE BY THIRD PARTIES

FIELD

The present invention relates to distributing information intended for publishing on a network.

BACKGROUND

Services like Dunn and Bradstreet™, Equifax™, etc. sell access to their databases to retrieve information about businesses and organizations. These databases are maintained by a large team of editors and staff to continuously update the records of these businesses and organizations. This service is considered valuable because businesses and organizations desire a way to publicize their information, such as contact information, executive team, investor relations information, financial performance, etc. Indeed, many businesses and organizations are required to submit their information and obtain a profile on at least one of these services.

Unfortunately, it is a difficult task for a business or organization to keep their profiles on these services up to date or free of duplicates. Some of the services, such as those offered by Dunn and Bradstreet, offer a "gold service" of information that businesses and organizations can use to compare the state of their published information. However, this service merely ensures that one copy is up to date or correct. Other information on the service may still be out of date, a duplicate, or (worse) inaccurate.

Accordingly, it may be desirable to provide methods and systems that allow organizations to easily publish up to date, accurate information.

BRIEF DESCRIPTION OF THE DRAWINGS

The accompanying drawings, which are incorporated in and constitute a part of this specification, illustrate embodiments of the teachings and together with the description, serve to explain the principles of the teachings.

DESCRIPTION OF THE EMBODIMENTS

For simplicity and illustrative purposes, the principles of the present teachings are described by referring mainly to exemplary embodiments thereof. However, one of ordinary skill in the art would readily recognize that the same principles are equally applicable to, and can be implemented in, all types of networked computer systems, and that any such variations do not depart from the true spirit and scope of the present teachings. Moreover, in the following detailed description, references are made to the accompanying figures, which illustrate specific embodiments. Electrical, mechanical, logical and structural changes may be made to the embodiments without departing from the spirit and scope of the present teachings. The following detailed description is, therefore, not to be taken in a limiting sense and the scope of the present teachings is defined by the appended claims and their equivalents.

Embodiments of the present information provide an open, wiki-style database for their information. That is, all information exists freely on an open platform that can be edited and updated freely. This feature ensures that the information is maintained current. In order to ensure accuracy, the present invention also includes a verification mechanism that would enable users to effectively "vote" that a particular record is correct. Users that represent a particular company would have a weighted, preferred vote, or even a controlling vote. In addition, the validity of information may also be based on the number of times it appears in use by other applications. Various portions of the information may also contain a confidence indicator "Highly Accurate", "Independent Verification Suggested", "Accurate as of January 2007," etc.

Reference will now be made in detail to the exemplary embodiments of the invention, which are illustrated in the accompanying drawings. Wherever possible, the same reference numbers will be used throughout the drawings to refer to the same or like parts.

Figure 1:
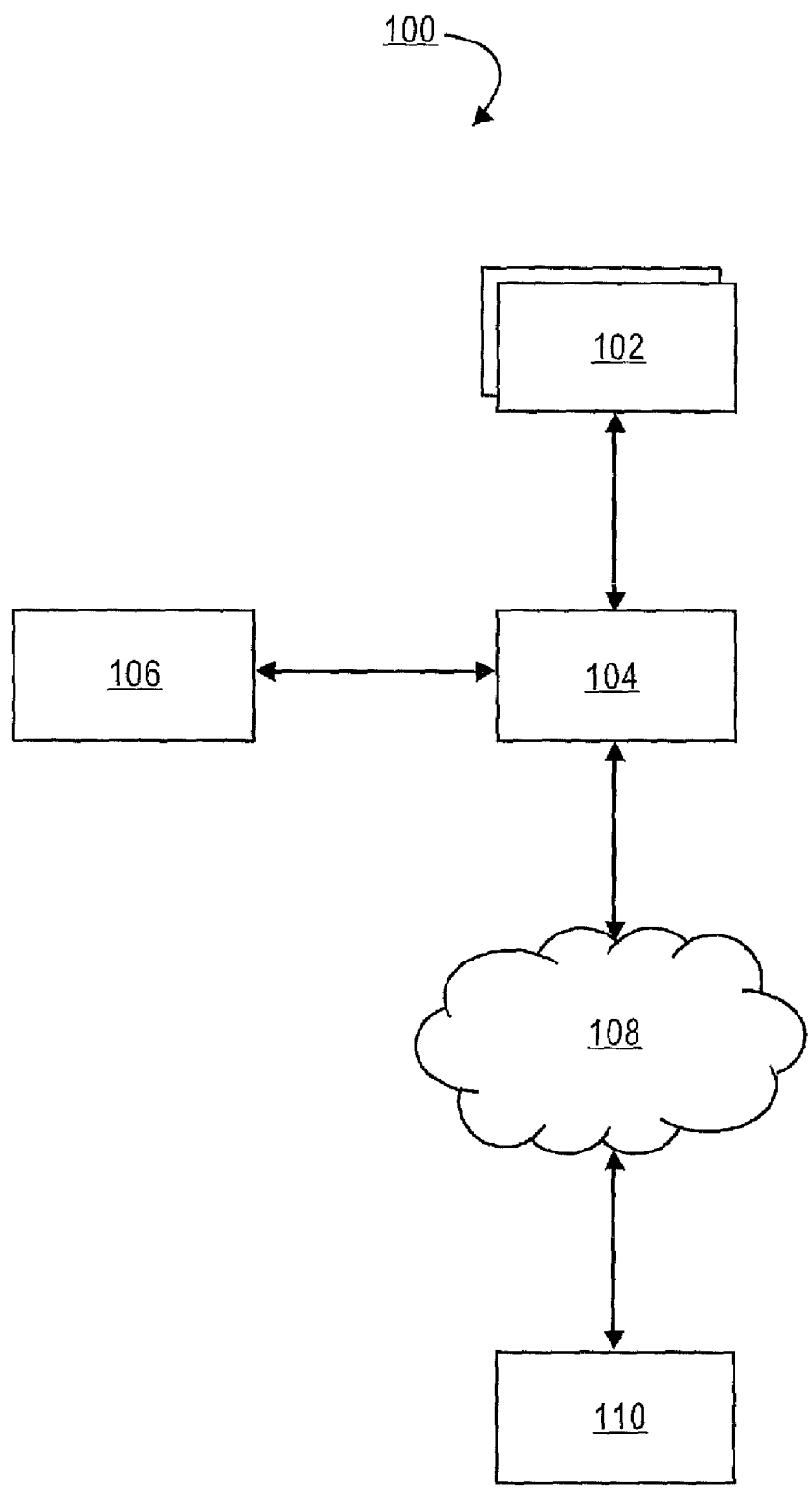
FIG. 1 illustrates an exemplary system of the present invention.

FIG. 1 illustrates an exemplary system diagram of the present invention. As shown, a system 100 of the present invention may comprise one or more companies 102 (such as company A and B), a publication service 104, an open database 106, a network 108, and a user 110. These components will now be further described.

Companies 102 represent any business or organization that wishes to have information about them publicized. The information provided by companies 102 may include: company legal name, one or more addresses, competitors, key customers, key suppliers/partners, key officers, revenue, number of employees, description of services, branch locations, subsidiaries/parent companies, etc.

Publication service 104 and open database 106 are a web-service that provides the information about companies. In some embodiments, publication service is a collaborative website, which can be directly edited by anyone with access to it. In some embodiments, publication service 104 is implemented in a wiki-style that enables documents to be written collaboratively in a simple markup language (such as HTML). In some embodiments, each of companies 102 is provided their own set of records or pages in which to publish their information as a starting point. Open database 106 provides the software and hardware for creating, browsing and searching information on publication service 104.

In publication service 104, the set of pages for companies 102 can be created and updated openly. In general, publication service 104 is designed to make it easy to keep information up to date and correct mistakes. The openness of system 100 is to encourage, as best possible, the use of the records of companies 102 and the breadth or growth that this information is accessed.

However, in order to provide a verification mechanism, publication service 104 may also comprise various user accounts that are required in order to create and update a record of companies 102. For example, publication service 104 may provide sessions that are used to sign edits or records by a particular user account. Many edits and additions can be made in real-time, and appear almost instantaneously online by publication service 104. Of course, in order to protect from abuse of system 100, the present invention may employ various forms of user authentication edit, and in some cases read certain records.

In addition, publication service 104 may provide a log to indicate the evolution of records for companies 102. For example, publication service 104 may provide a "Recent Changes" page, which a list numbering recent edits or a list of all the edits made within a given time frame. Other validity tracking features may also be provided, such as a revision history showing previous page versions; and a difference feature highlighting the changes between two revisions. Furthermore, publication service 104 may notify companies 102 when changes to their records have been made, thus allowing them to verify the validity of new editions or changes quickly. In some embodiments, publication service 104 may employ various tools that automatically identify and, if needed, remove "vandalism" to records of companies 102.

Publication service 104 and open database 106 may be implemented based on content management systems, which are well known to those skilled in the art. In general, publication service 104 and open database 106 will include software and hardware to create and edit records at any time through a web browser, embed a name of the respective companies 102 with their records, and provide the validity and revision history features described above.

Network 108 is the communications infrastructure the couples the components of system 100. For example, network 108 may be implemented on the Internet and employ the typical communications protocols, such as TCP/IP and HTML. Of course, other types of networks, such as a local area network, wide area network, and the like may be employed in network 108.

User 110 may be any entity or person that uses the services of publication service 104. For example, user 110 may be another company that is attempting to verify information about companies 102 or collect information about companies 102. In general, user 110 may interface with publication service 104 via a standard web browser, such as Firefox or Internet Explorer.

Figure 2:
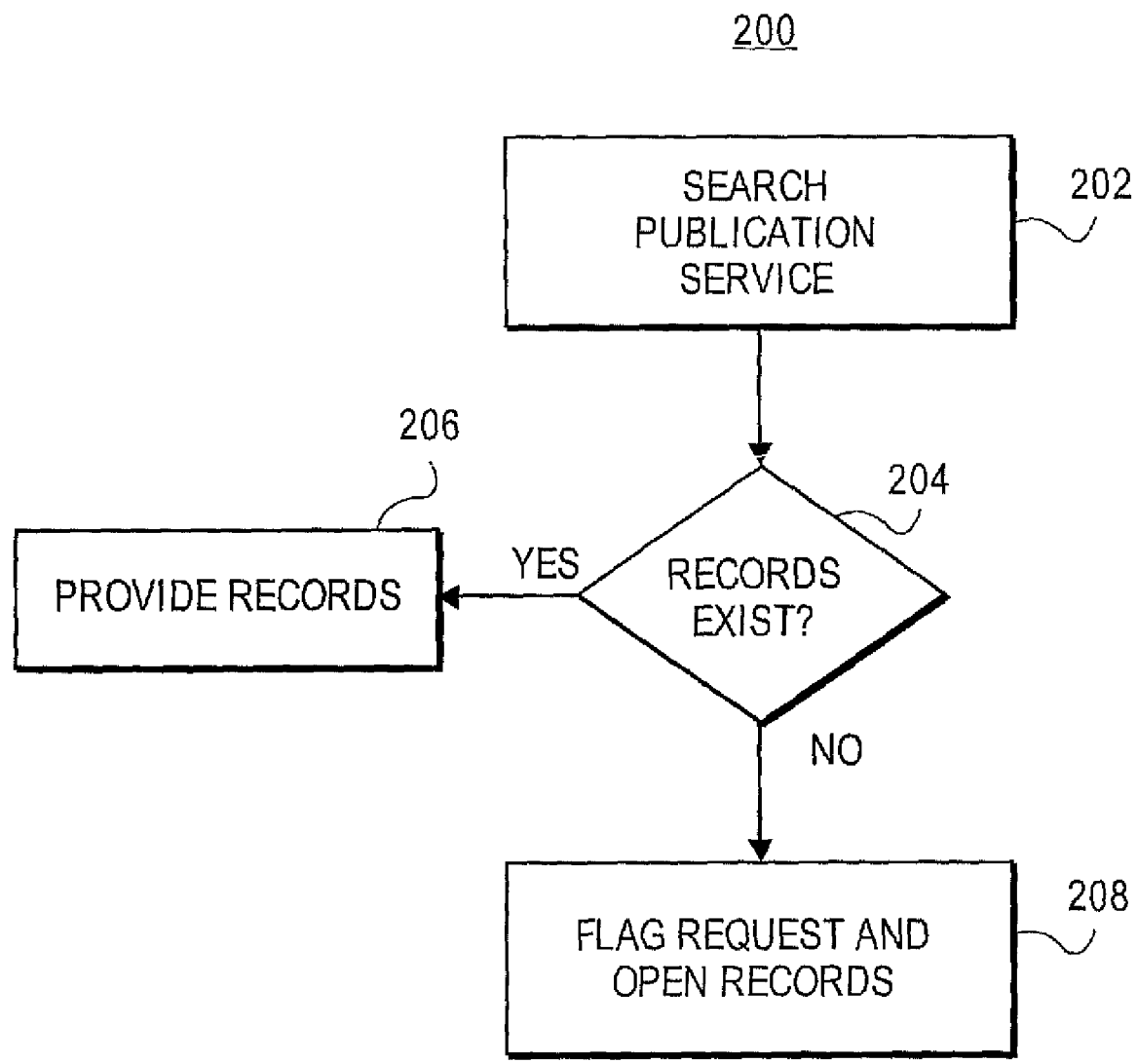
FIG. 2 illustrates an exemplary process flow for publishing accurate and current information about a company or entity in accordance with the present invention.

FIG. 2 is now provided to illustrate one scenario in which a user may utilize the services of the present invention. In particular, user 110 may use publication service 104 to collect information about companies 102. Accordingly, in stage 202, a user 110 may access and query the records of companies 102 in publication service 104. In stage 204, publication service 204 checks for the requested records of companies 102. If the records are found, then in stage 206 and they are provided to user 110. For example, the records of companies 102 are displayed on a web page to user 110.

If the records are not found then processing may flow to stage 208. In stage 208, publication service flags the request. The records of that company are then opened for update and editing. In this situation, publication service 104 may notify companies 102 that information is needed for their records. Alternatively, publication service 104 may provide a stub record that encourages submissions for the missing records. Users of publication service 104 are then able to update the records for companies 102.

Of note, information in records about companies 102 may come from the companies themselves or third parties. For example, as noted, publication service 104 may implement a verification mechanism would enable "votes" that a particular record about companies 102 is correct. Persons that represent a particular company (via a special user account or other identification, such as tax ID) may have a weighted vote. The vote may be requested from all users of publication service 104, or a community of users that may have a particular interest in companies 102, such as customer group, an industry group, etc.

Incentive systems, such as payments or other forms of credit, may also be applied in the present invention to encourage people to submit accurate information about companies 102. For example, third parties that are known to provide accurate information may be given more weight to their votes and incentives (such as payment or credit) for their participation in publication service 104. The incentives or payment may also be based on a history of prior submissions by the person or source of the update. In addition, updates to information about companies 102 from these third parties that have a history may be preferentially entered and published by publication service 104.

In stage 210, publication service 104 also indicates the validity of fields in the records about companies 102. In some embodiments, the validity of fields in a record would be a result of the number of times it appears in use in applications that are using publication service 104. Each field, for example, may contain a confidence indicator, such as "Highly Accurate", "Confirmed," "Independent Verification Suggested," and the like.

As noted, the confidence indicator may be the result of a vote. Alternatively, the validity of a record may also be judged based on the breadth or nature of its use by other companies and applications. For example, once the record is used by another service, such as Dunn and Bradstreet, Equifax, etc., that record may annotated with information to indicate this use. As more of these services rely on the record, then publication service may update the confidence indicator accordingly.

Furthermore, in some embodiments, public information (location, contact information, etc.) may be the default information that is published via publication service 104. However, if authorized (for example, based on the user's account privileges), a user may request, such as right click on a customer name, to pull up public information as well as the proprietary or other confidential information.

Certain embodiments may be performed as a computer program. The computer program may exist in a variety of forms both active and inactive. For example, the computer program can exist as software program(s) comprised of program instructions in source code, object code, executable code or other formats; firmware program(s); or hardware description language (HDL) files. Any of the above can be embodied on a computer readable medium, which include storage devices and signals, in compressed or uncompressed form. Exemplary computer readable storage devices include conventional computer system RAM (random access memory), ROM (read-only memory), EPROM (erasable, programmable ROM), EEPROM (electrically erasable, programmable ROM), and magnetic or optical disks or tapes. Exemplary computer readable signals, whether modulated using a carrier or not, are signals that a computer system hosting or running the present invention can be configured to access, including signals downloaded through the Internet or other networks. Concrete examples of the foregoing include distribution of executable software program(s) of the computer program on a CD-ROM or via Internet download. In a sense, the Internet itself, as an abstract entity, is a computer readable medium. The same is true of computer networks in general.

While the teachings has been illustrated with respect to one or more implementations, alterations and/or modifications can be made to the illustrated examples without departing from the spirit and scope of the appended claims. In addition, while a particular feature of the teachings may have been disclosed with respect to only one of several implementations, such feature may be combined with one or more other features of the other implementations as may be desired and advantageous for any given or particular function. Furthermore, to the extent that the terms "including", "includes", "having", "has", "with", or variants thereof are used in either the detailed description and the claims, such terms are intended to be inclusive in a manner similar to the term "comprising."

Other embodiments of the teachings will be apparent to those skilled in the art from consideration of the specification and practice of the teachings disclosed herein. It is intended that the specification and examples be considered as exemplary only, with a true scope and spirit of the teachings being indicated by the following claims.

What is claimed is:

1. A method of maintaining published information about an entity, said method comprising:
    permitting updates to information about an entity, the information being stored on a server associated with a website;
    receiving one or more votes on a validity of the updated information from one or more sources;
    determining whether the one or more votes should be given a higher weight based on the one or more sources being representatives of the entity, being participants in an incentive system for providing the updated information, or being both representatives of the entity and participants in the incentive system;
    determining a confidence indicator of the updated information based on the determination of the higher weight of the one or more votes; and
    publishing the updated information about the entity and the confidence indicator on the website.

2. The method of claim 1, wherein the information is stored on a wiki that is accessible via the website.

3. The method of claim 1, wherein permitting updates to the information comprises requesting authentication information from a source of the updates.

4. The method of claim 1, wherein determining whether the one or more votes should be given the higher weight is further based on a history of prior updates submitted by the one or more sources.

5. The method of claim 1, wherein the one or more sources are other users not associated with the entity.

6. The method of claim 1, further comprising sending a notice to the entity when the updated information about the entity has been published.

7. The method of claim 1, wherein the one or more sources are users of the website.

8. The method of claim 1, wherein the incentives are based on whether the updates are published on the website.

9. The method of claim 1, wherein the incentives are based on a history of prior updates by the one or more sources.

10. The method of claim 1, wherein publishing the updated information about the entity and the confidence indicator on the website comprises publishing information about the entity that is considered public by the entity.

11. The method of claim 1, wherein publishing the updated information about the entity and the confidence indicator on the website comprises selectively publishing information about the entity that is considered proprietary by the entity based a party requesting the information.

12. An apparatus for maintaining published information about an entity, said apparatus comprising:
    a memory adapted to store information about an entity, the information being associated with a website; and
    a processor adapted to execute a publication service, wherein the publication service is configured to permit updates to the information about the entity; receive one or more votes on a validity of the updated information from one or more sources, determine whether the one or more votes should be given a higher weight based on the one or more sources being representatives of the entity, being participants in an incentive system for providing the updated information, or being both representatives of the entity and participants in the incentive system; determine a confidence indicator of the updated information based on the determination of the higher weight of the one or more votes; and publish the updated information about the entity and the confidence indicator on the website.

13. A computer readable storage medium comprising executable program code to configure a computer to perform the method of claim 1.

* * * * *